US012640945B2

(12) United States Patent
Deng et al.

(10) Patent No.: US 12,640,945 B2
(45) Date of Patent: *May 26, 2026

(54) GENERATION OF USER-SPECIFIC TIME-TO-LIVE VALUES USING MACHINE LEARNING

(71) Applicant: PayPal, Inc., San Jose, CA (US)

(72) Inventors: Yuan Deng, Singapore (SG); Rajesh Bala Kancharla, Singapore (SG)

(73) Assignee: PayPal, Inc., San Jose, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 17/986,724

(22) Filed: Nov. 14, 2022

(65) Prior Publication Data

US 2023/0075676 A1     Mar. 9, 2023

Related U.S. Application Data

(63) Continuation of application No. 16/732,055, filed on Dec. 31, 2019, now Pat. No. 11,502,857.

(51) Int. Cl.
H04L 9/32        (2006.01)
G06N 3/049       (2023.01)
G06N 20/00       (2019.01)

(52) U.S. Cl.
CPC ........... H04L 9/3297 (2013.01); G06N 3/049 (2013.01); G06N 20/00 (2019.01)

(58) Field of Classification Search
CPC ....... H04L 9/3297; G06N 20/00; G06N 3/049
See application file for complete search history.

(56) References Cited

U.S. PATENT DOCUMENTS

| | | | |
|---|---|---|---|
| 9,635,043 B1 | 4/2017 | Knecht et al. | |
| 10,182,033 B1 * | 1/2019 | Farhangi | H04L 43/16 |
| 10,789,242 B2 | 9/2020 | Cho et al. | |
| 2006/0248124 A1 * | 11/2006 | Petev | G06F 12/0842 |
| | | | 711/E12.039 |

(Continued)

OTHER PUBLICATIONS

Brownlee J., "How to Make Predictions with Long Short-Term Memory Models in Keras," Retrieved from the internet: https://machinelearningmastery.com/make-predictions-long-short-term-memory-models-keras/ on Dec. 23, 2019, last updated on Aug. 14, 2019, 7 pages.

(Continued)

*Primary Examiner* — William P Bartlett
(74) *Attorney, Agent, or Firm* — Kowert, Hood, Munyon, Rankin & Goetzel, P.C.; Catherine L. Gerhardt; Dean M. Munyon

(57)                ABSTRACT

Techniques are disclosed relating to generating user-specific time-to-live (TTL) values using machine learning. In various embodiments, a server system maintains a cache data store that is operable to store data for a plurality of users of a web service. In response to a cache miss for a request from a first one of the plurality of users, the server system may generate a user-specific TTL value for the first user. In various embodiments, generating the user-specific TTL value may include using a machine learning model to generate a predicted future access pattern for the first user that indicates a distribution of time periods during which the first user is expected to access the web service and, based on the predicted future access pattern, determining the user-specific TTL value for the first user.

20 Claims, 7 Drawing Sheets

(56)                    References Cited

U.S. PATENT DOCUMENTS

| | | |
|---|---|---|
| 2007/0282699 A1 | 12/2007 | Kumar et al. |
| 2015/0178277 A1 | 6/2015 | Singhal |
| 2019/0109926 A1 | 4/2019 | Hotchkies et al. |
| 2019/0197191 A1 | 6/2019 | Sachdev et al. |
| 2019/0332698 A1 | 10/2019 | Cho et al. |
| 2020/0137094 A1 | 4/2020 | Janakiraman |
| 2022/0191215 A1* | 6/2022 | Ciano .................. H04L 63/108 |

OTHER PUBLICATIONS

Brownlee J., "Time Series Prediction with LSTM Recurrent Neural Networks in Python with Keras," Retrieved from the internet: https://machinelearningmastery.com/time-series-prediction-lstm-recurrent-neural-networks-python-kera . . . on Dec. 19, 2019, last updated on Aug. 5, 2019, 7 pages.
Mwangi B., "An Intro Tutorial for Implementing Long Short-Term Memory Networks (LSTM)," Retrieved from the internet: https://heartbeat.fritz.ai/a-beginners-guide-to-implementing-long-short-term-memory-networks-lstm-eb . . . on Dec. 31, 2019, 14 pages.

* cited by examiner

<u>500</u>

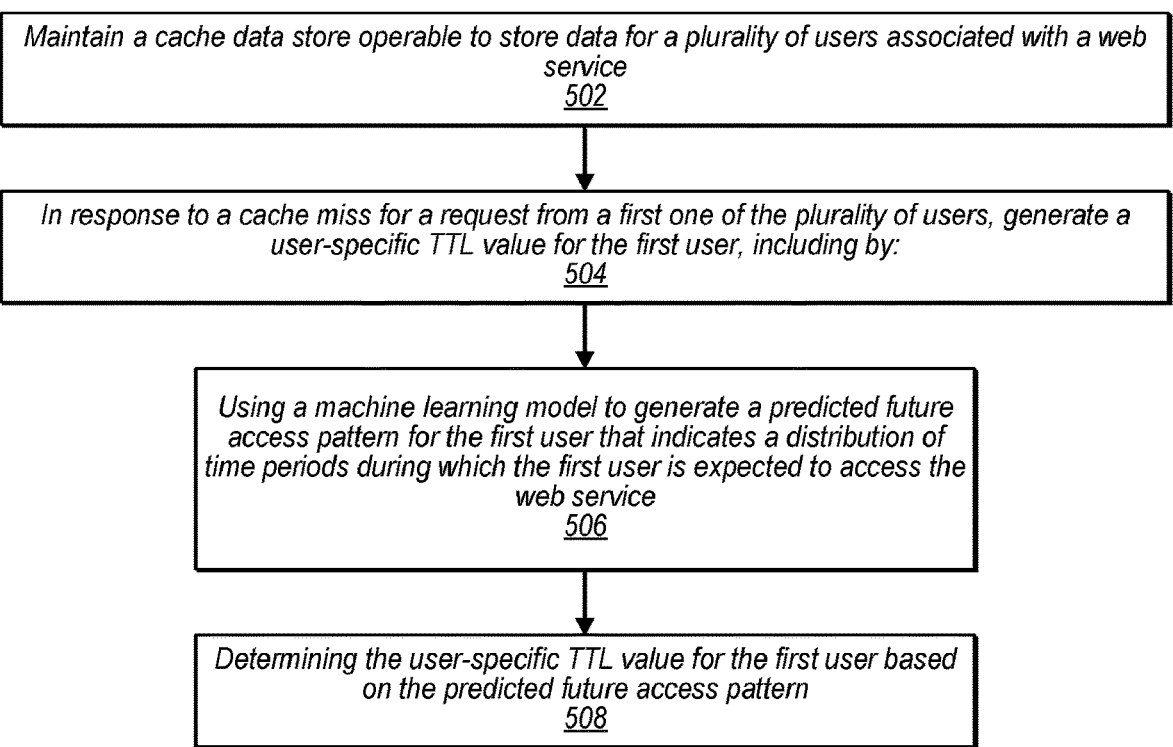

Maintain a cache data store operable to store data for a plurality of users associated with a web service
<u>502</u>

In response to a cache miss for a request from a first one of the plurality of users, generate a user-specific TTL value for the first user, including by:
<u>504</u>

Using a machine learning model to generate a predicted future access pattern for the first user that indicates a distribution of time periods during which the first user is expected to access the web service
<u>506</u>

Determining the user-specific TTL value for the first user based on the predicted future access pattern
<u>508</u>

Maintain a cache data store operable to store data for a plurality of users associated with a web service
<u>602</u>

Train a machine learning model based on access pattern information corresponding to a set of the plurality of users of the web service, where, for a given one of the set of users, the access pattern information is indicative of an access history, of the given user, of the web service over a previous time period
<u>604</u>

In response to a cache miss associated with a first one of the plurality of users, generate a user-specific TTL value for the first user using the machine learning model
<u>606</u>

FIG. 6

GENERATION OF USER-SPECIFIC TIME-TO-LIVE VALUES USING MACHINE LEARNING

CROSS-REFERENCE TO RELATED APPLICATIONS

This application is a continuation of U.S. patent application Ser. No. 16/732,055, filed Dec. 31, 2019 which is incorporated herein by reference in its entirety.

BACKGROUND

Technical Field

This disclosure relates generally to cache systems and, more particularly, to generating user-specific time-to-live values using machine learning.

Description of the Related Art

Server systems, such as web servers, application servers, etc., may use cache data stores to increase the speed with which data may be provided to end users. For example, when the server system receives a request for data from a client device, the server will retrieve the data from the underlying database and provide it to the client device. The server system may then store the data in a cache so that future requests for the same data may be served more quickly. The use of a cache data store presents certain technical challenges, however. For example, cache systems are often small relative to the size of the underlying persistent data store (e.g., a database) itself, with only a small subset of the data from the underlying database stored in the cache at a given time. As such, cache systems will often evict data from the cache using the same, static "time-to-live" (TTL) values, regardless of the user for which the data was originally retrieved. This, in turn, results in inefficient utilization of cache storage and a decreased cache-hit ratio, degrading the performance of the cache and the server system as a whole.

BRIEF DESCRIPTION OF THE DRAWINGS

FIG. 5 is a flow diagram illustrating an example method for generating user-specific TTL values, according to some embodiments.

FIG. 6 is a flow diagram illustrating an example alternative method for generating user-specific TTL values, according to some embodiments.

DETAILED DESCRIPTION

Figure 1:
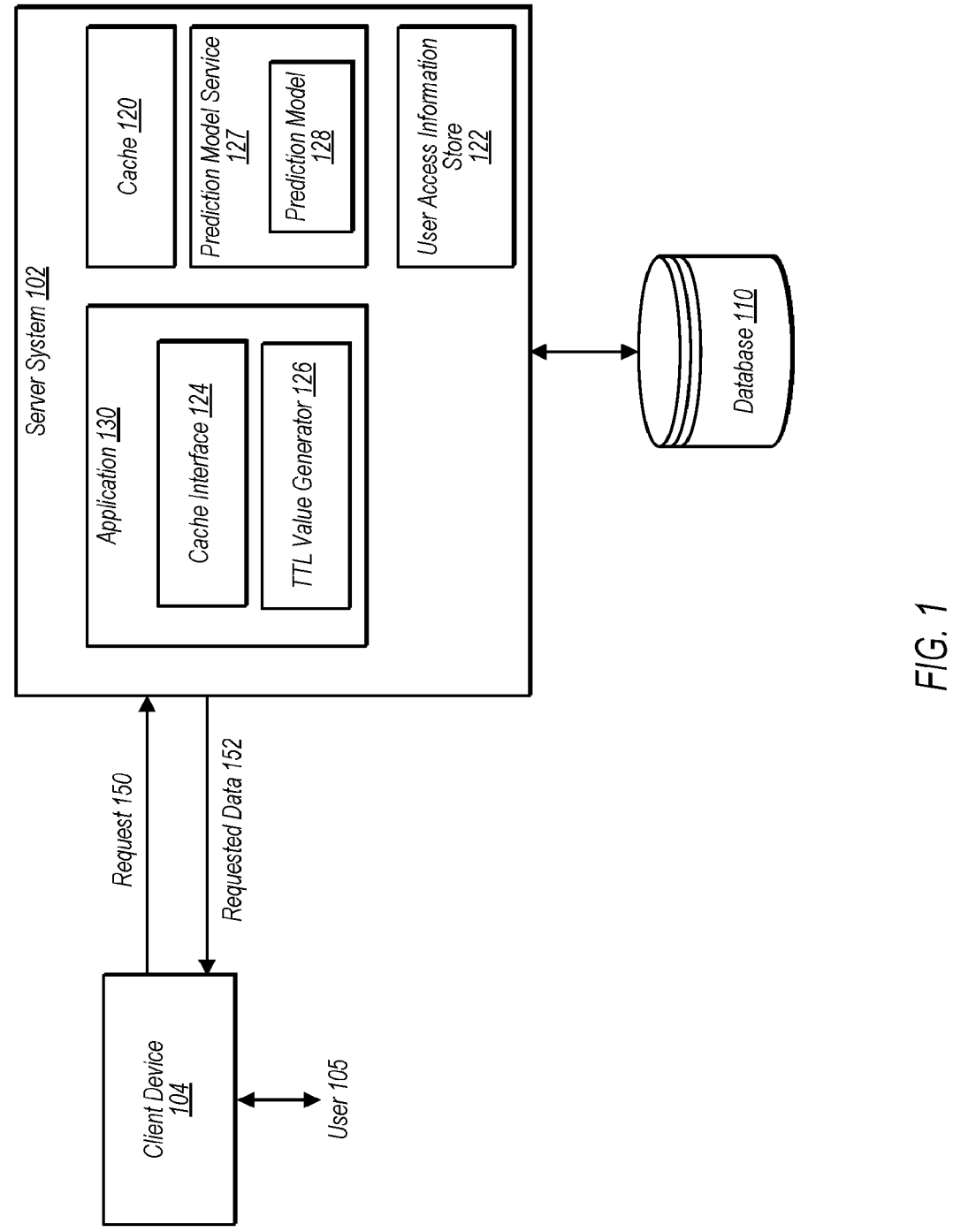
FIG. 1 is a block diagram illustrating an example system that may be used to generate user-specific TTL values using machine learning, according to some embodiments.

Server systems, such as web servers, application servers, etc., may be used to provide computing resources and services to various remote users. For example, one or more application servers may be used to provide access to software applications to remote users via a network. As part of providing these computing resources, the server systems will typically store and retrieve data associated with the end users. For example, a server system may include (or have access to) one or more databases (or any other suitable form of persistent storage, as desired) used to store account information associated with the users. Retrieving data from the underlying databases is relatively computationally expensive, however, requiring more time to provide the end users with data from the database.

Accordingly, many server systems will utilize a cache data store to increase the speed with which data may be provided to an end user. For example, when the server system receives a request for data from a client device, the server will retrieve the data from the underlying database and provide it to the client device. The server system may then store the data in the cache so that future requests for the same data may be served more quickly.

The use of a cache also presents certain technical challenges, however. For example, to provide efficient data retrieval, cache systems are often small relative to the size of the underlying database itself, with only a small subset of the data from the underlying database stored in the cache at a given time. As such, the data that is stored in the cache is typically rotated, with "older" data being removed or "evicted" from the cache to free-up space for more-recently retrieved data. Cache systems often use a TTL value to indicate when a particular data item was added to the cache or the amount of time before the data item is to be removed from the cache. Prior cache systems will often assign static TTL values for all data items stored in the cache, without regard for the access patterns of the user for which the data item was originally retrieved.

Such an approach presents various technical shortcomings. For example, consider the following grouping of users based on their access patterns: frequent users (users who access a web service on a daily or almost daily basis); weekly users (users who access the web service once-twice per week); monthly users (users who access the web service between one and three times per month); and infrequent users (who access the web service very infrequently, less than once per month). Prior cache systems will often use the same static TTL values (e.g., 7 days) for users in each of these groups, despite their vastly different access patterns. For example, for an infrequent user who uses the web service approximately once every three months, such a prior system will store the user's data in the cache with a static TTL value (e.g., 7 days) that does not correspond to the actual access pattern of the user. In this scenario, the system will store the user's data in the cache for 7 days before it is evicted. Since the user only uses the service approximately once every three months, however, the server system is rarely (if ever) able to service that user's requests from the cache. Thus, in such a system, the infrequent user does not get to benefit from the performance improvements offered by the cache, and the server system wastes its limited cache space storing data for which there will rarely (if ever) be a cache hit. This, in turn, degrades performance of the web service for users who do benefit from use of a cache system. For example, by storing data of infrequent users in the cache for extended periods of time (e.g., 7 days), the cache system is wasting storage space that could otherwise be used for more frequent users whose requests are more likely to be serviced from the cache.

The disclosed systems and methods may solve these and other technical problems by generating user-specific TTL values using machine learning. For example, in some embodiments, a server system may maintain a cache data store that is operable to store data for a plurality of users associated with a web service. The server system may receive various requests for data from end users. In response to a cache miss for a request from a first user, the server system may generate a user-specific TTL value for the first user using a machine learning model. For example, the server system my use a machine learning model to generate a predicted future access pattern for the first user that indicates a distribution of days, over a future time period, on which the first user is expected to access the web service. Based on the predicted future access pattern, the server system may then determine a user-specific TTL value for the first user, which may then be applied to one or more data items, associated with the first user, that are stored in the cache.

For example, for a frequent user, the predicted future access pattern may indicate that the user is expected to access the web service every day for the next 25 days. In such an embodiment, the server system may select a user-specific TTL value such that the user's data remains in the cache for the next 25 days before it is evicted, which will increase the cache-hit ratio for the user and improve the user's overall experience with the web service. Further consider a second user who often accesses the web service multiple times per week but, based on the second user's access history, the predicted future access pattern indicates that the second user is expected to access the service each of the next three days but is not expected to access the service again for the following 10 days. In such an embodiment, the server system may select a user-specific TTL value such that the second user's data remains in the cache for the next three days before it is evicted, which will allow the second user to benefit from the use of the cache without retaining the second user's data in the cache longer than necessary to the detriment of other users.

Further note that the disclosed systems and methods do not simply scale the TTL value for a user based on the user's previous access history. For example, the disclosed systems do not simply assign the same, long TTL value for all users that may be deemed "frequent" users and the same, short TTL value for all users that may be deemed "infrequent" users. Such an approach also suffers from various technical shortcomings. For example, this crude scaling technique is not user-specific and is not granular enough to select optimal TTL values, relying only on one factor (a user's access frequency) while ignoring a user's actually access pattern history, resulting in poor cache utilization and hit rate. The disclosed systems and methods, by contrast, generate a predicted future access pattern for a user using a prediction model that is trained based on access pattern information indicative of the actual access history of various users of the web service. Using this predicted future access pattern enables the disclosed techniques to select user-specific TTL values that are based on a distribution of days in the future on which the user is expected to access the web service, resulting in higher cache utilization and hit ratio relative to prior systems.

In various embodiments, the disclosed techniques may provide various technical benefits. For example, in some embodiments, the disclosed techniques enable more efficient use of cache in a manner that increases storage utilization and cache-hit ratio. Further, with this increase in the cache-hit ratio, the disclosed systems and methods save time and computational resources that would be otherwise be expended to service requests from the underlying persistent storage, rather than from the cache. This, in turn, may increase the speed with which user requests are serviced by the system, improving the quality of the user experience and the functioning of the system as a whole.

Referring now to FIG. 1, a block diagram is depicted of an example system 100 that may be used to generate user-specific TTL values using machine learning, according to some embodiments. In FIG. 1, system 100 includes server system 102 and client device 104. In various embodiments, server system 102 is operable to provide one or more computing resources (e.g., as part of one or more web services) to various end users over one or more networks (not shown, for clarity). For example, in the depicted embodiment, server system 102 hosts a software application 130, which may be accessed by user 105 over one or more networks using client device 104.

As part of providing application 130, server system 102 may store and retrieve various items of data associated with various users, such as user 105. For example, in various embodiments, server system 102 includes (or has access to) one or more databases 110 (or any other suitable type of persistent storage, as desired), which may be used to store data associated with various user accounts, software applications, the server system 102, etc. In various embodiments, the server system 102 may retrieve data from database 110 to service requests from client devices. As noted above, it can be computationally expensive and time consuming to retrieve data from database 110. As such, in various embodiments, server system 102 implements a cache 120 that may be used to store data for multiple users associated with a web service provided by server system 102. Cache 120 may be implemented using any of various suitable technologies. As one non-limiting example, in some embodiments cache 120 is implemented using a Couchbase™ NoSQL database. Note, however, that this embodiment is provided merely as an example and any other suitable technology may be used. While prior cache systems may evict data based on static TTL values, such systems suffer from the various technical problems described above. In various embodiments, however, the disclosed systems and methods overcome these technical problems by generating user-specific TTL values.

In the depicted embodiment, for example, server system 102 receives a request 150 from user 105. Request 150 may be a request for data as part of using software application 130, for example. Once server system 102 receives the request 150, cache interface 124 is operable to determine whether the requested data 152 is already stored in the cache 120. If so, the requested data 152 may be retrieved directly from the cache 120 and provided to the client device 104. If the requested data is not found in the cache 120 (that is, in the event of a cache miss), however, cache interface 124 (or another module in server system 102) may retrieve the requested data 152 from the underlying database 110 and provide it to the client device 104. In various embodiments, cache interface 124 may store this requested data 152 in cache 120 to enable faster retrieval of the data 152 for subsequent requests from user 105.

In various embodiments, server system 102 includes TTL value generator 126 and prediction model service 127. TTL value generator 126, in various embodiments, is operable to generate a user-specific TTL value for a given user (e.g., user 105) based on a predicted future access pattern for the first user. This predicted future access pattern, in various embodiments, is generated based on access pattern information that indicates the user 105's access history of the server system 102 over a previous time interval (e.g., 30 days, 60 days, etc.). For example, as described in more detail below with reference to FIG. 2, prediction model service 127 is operable to use machine learning techniques to generate a predicted future access pattern for the user 105. In various embodiments, prediction model service 127 is operable to train a prediction model 128 (e.g., a machine learning model) based on access pattern information for various users of the server system 102 (e.g., users of one or more web services provided by server system 102), where the access pattern information indicates the various users' access history of the server system 102 over a previous time interval (e.g., 30 days, 60 days, etc.). The prediction model service 127 may then use the trained prediction model 128 to generate a predicted future access pattern that specifies a distribution of time periods (e.g., days) on which the user 105 is expected to access one or more of the web services provided by server system 102. Prediction model service 127 may then provide information indicative of this predicted future access pattern to TTL value generator 126, which is operable to determine, for the user 105, a user-specific TTL value based on the predicted future access pattern.

In various embodiments, this user-specific TTL value may be used (e.g., by cache 120) to determine when to evict the requested data 152 from the cache 120. For example, this user-specific TTL value may be stored along with the requested data 152 in the cache 120, where the user-specific TTL value may be used to determine when the requested data 152 is to be evicted from the cache 120. For example, in various embodiments, cache 120 includes one or more modules that are operable to evict data from the cache 120 based on the data's respective TTL values. When cache 120 determines that a TTL value for a first data item stored in the cache 120 has expired, the cache 120 may evict the first data item from the cache 120 (e.g., by actually deleting the requested data 152 from cache memory, by invalidating a key used to retrieve the requested data 152, or using any of various other suitable techniques).

Figure 2:
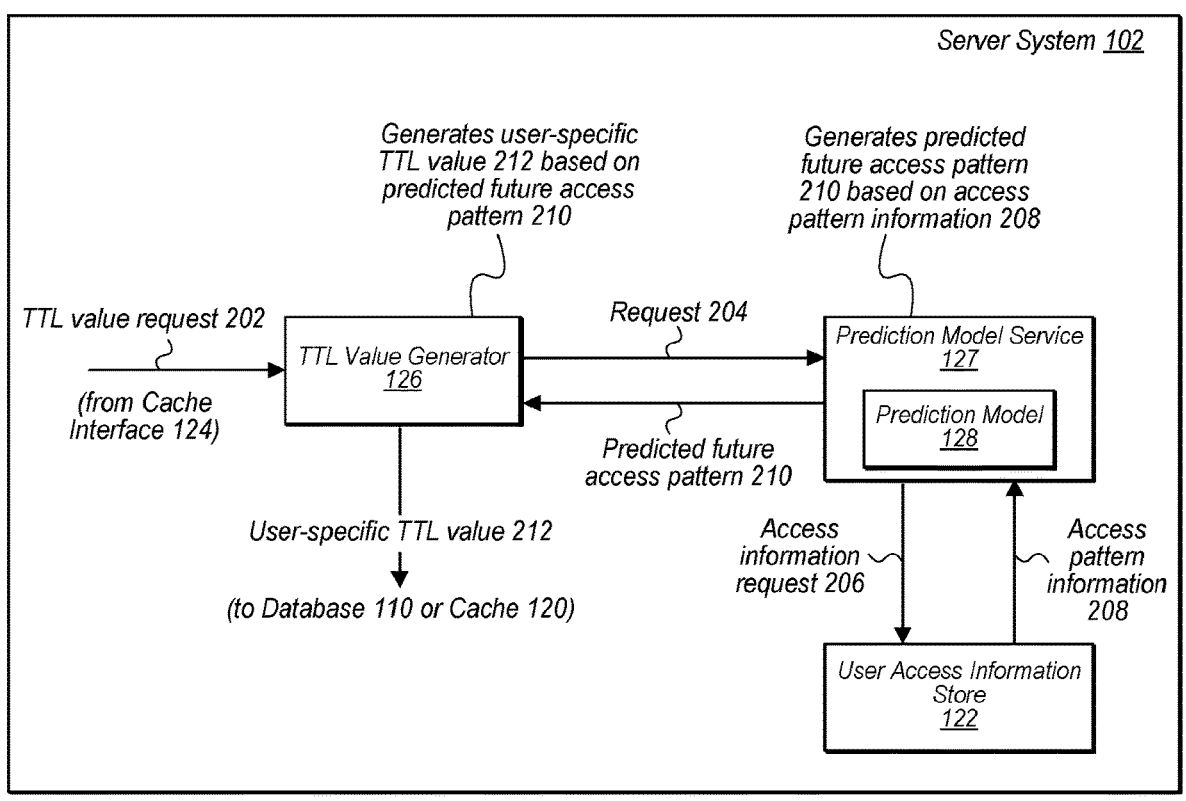
FIG. 2 is a block diagram illustrating an example server system, according to some embodiments.

FIG. 2 depicts a block diagram of a server system 102 with a more detailed view of the operations performed to generate a user-specific TTL value, according to some embodiments. In FIG. 2, server system 102 includes TTL value generator 126, which, in various embodiments, is operable to generate a user-specific TTL value based on a user's predicted future access pattern. For example, in the depicted embodiment, TTL value generator 126 receives a TTL value request 202 from cache interface 124. In various embodiments, TTL value request 202 may include any of various items of information. For example, in some embodiments, TTL value request 202 may indicate the user 105 for which the TTL value is to be generated, the requested data 152, a data type of the requested data 152, the web service(s) the user 105 is accessing, etc.

In response to TTL value request 202, TTL value generator 126 is operable to send a request 204 (e.g., as an API call) to prediction model service 127, requesting a future access pattern associated with the user 105. In various embodiments, request 204 may similarly include various items of information, such as an identifier (e.g., a user account number) associated with the user 105, the service being accessed, the status of the service, etc. As one non-limiting example, in some embodiments the server system 102 may provide an online payment service to various remote users. In some such embodiments, request 202 or 204 may specify, for example, a user account number for the user 105, a payment instrument being used by user 105, a status of the instrument, etc. Note, however, that this embodiment is provided merely as one non-limiting example. In other embodiments, server system 102 may provide any of various types of web services and the requests 202 or 204 may specify various types of information, as desired.

In various embodiments, prediction model service 127 is operable to generate a predicted future access pattern for a user 105 based on access pattern information associated with that user 105. For example, in various embodiments, prediction model service 127 is operable to train a prediction model 128 (e.g. a machine learning model) during a "training phase" based on access pattern information corresponding to various users of one or more web services provided by server system 102. That is, in various embodiments, the prediction model 128 is trained using data corresponding to the access patterns of multiple users, making the prediction model 128 itself user-agnostic. As explained in more detail below, after the prediction model 128 has been trained, it may then be used during a "production phase" to generate a predicted future access pattern for a requesting user (e.g., user 105) that is specific to the requesting user and indicates a distribution of time periods (e.g., days) in the future during which the requesting user is expected to access the web service. This predicted future access pattern may then be used, e.g., by TTL value generator 126, to generate a user-specific TTL value for a requesting user, as described in more detail below.

During the training phase, prediction model service 127 is operable to retrieve access pattern information for various users (which may include all or any suitable subset of the users of server system 102) from the user access information store 122 that is included in (or accessible to) server system 102. For a given one of these various users, the access pattern information is indicative of the given user's access history of one or more of the web services provided by server system 102 over a particular time period. In some embodiments, for example, the access pattern information is provided as a list of binary digits that correspond to a visiting pattern of the given user over a particular time period. In some such embodiments, each index of the list may indicate whether the given user accessed the web service (e.g., by logging in, making an access request, etc.), with a "0" indicating that the user did not access the web service on a given day and a "1" indicating that the user did access the web service on the given day. For example, the access pattern "[1, 1, 0]," in such an embodiment, would indicate that a given user did access the web service on both the first and second days of the particular time period but did not access the service on the third day. In this example embodiment, the access pattern information does not indicate the amount of access by a given user during a given day, just whether there was at least some access during that day. Note, however, that this embodiment is provided merely as one non-limiting example. In other embodiments, the access pattern information may be provided as a list of digits (e.g., from "0"-"10" or any other suitable range) indicating both whether a user accessed the web service during a given day (e.g., as indicated by a value other than "0") and, if so, a level of access during the given day (e.g., with higher values for an index in the list indicating a higher level of access).

As noted above, in some embodiments, prediction model 128 is a machine learning model. For example, in some embodiments, prediction model 128 is a long short-term memory (LSTM) model that is trained using the access pattern information for the various users. Note, however, that this embodiment is provided merely as one non-limiting example. In other embodiments, prediction model 128 may be implemented using any of one or more suitable machine learning models. For example, in some embodiments, prediction model 128 may be implemented using one or more artificial recurrent neural networks (RNNs). Note that, during the training process, a cost function may be calculated by assessing whether the model 128 is able to predict, for a given one of the various users, the given user's access history (e.g., logins, transaction history, etc.) correctly. As a non-limiting example, the access pattern information may, in some embodiments, include at least 60 days' worth of access information for each of the various users, such that prediction model service 127 may use the first 30 days' worth of data as training data and the next 30 days' worth of data as test data to refine the model parameters and ensure that the predictive model 128 can predict future access patterns accurately. Note, however, that this embodiment is provided merely as one non-limiting example. In other embodiments, various suitable amounts and ratios of training and test data may be used to generate the predictive model 128. Further note that, in various embodiments, the "training phase" is performed prior to the "production phase" in which the trained predictive model 128 is used to generate predicted future access patterns for specific users, such as user 105.

In FIG. 2, once the prediction model service 127 receives the request 204, it is operable to retrieve the access pattern information 208 for the user 105 from the user access information store 122 In various embodiments, access pattern information 208 is indicative of the user 105's access history of one or more of the web services provided by server system 102 over a particular time period. For example, in some embodiments, access pattern information 208 may be provided as a list of binary digits (or digits in any other suitable range) that correspond to a visiting pattern of the user 105 over a particular time period, as discussed above. Once trained, prediction model 128, in various embodiments, is usable to generate a time-series prediction of the user 105's future pattern of accessing the web service provided by server system 102. For example, in some embodiments, the output of predictive model 128 (that is, the predicted future access pattern 210) is a sequence of binary digits (e.g., [1, 1, 0, 1, . . . , 0]) with each index indicating whether the user 105 is expected to access the web service on a given day. For example, in some embodiments, a value of "0" for a first index in the predicted future access pattern 210 would indicate that the user 105 is not expected to access the service on the next day (e.g., the first day after the day of the current request 150), whereas a "1" would indicate that the user 105 is expected to access the service on that day. Thus, in various embodiments, predicted future access pattern 210 indicates the days (or other time periods) in the future that the user 105 is expected to use the service provided by server system 102.

TTL value generator 126 may generate the user-specific TTL value 212 for the user 105 using any of various suitable algorithms or techniques. For example, in some embodiments, TTL value generator 126 is operable to select the user-specific TTL value 212 as a number that corresponds to the last consecutive day on which the user 105 is expected to access the web service. For example, consider an embodiment in which the predicted future access pattern 210 indicates that the user is expected to access the web service every day for the next seven days, but not on the 8$^{th}$ day. In such an embodiment, the TTL value generator 126 may select the user-specific TTL value 212 such that the requested data 152 (for which the user-specific TTL value 212 is generated) will remain in the cache 120 until the last consecutive day on which the user 105 is expected to access the service. Stated differently, in some such embodiments, the TTL value generator 126 may set the user-specific TTL value 212 to be the last consecutive day on which there is an expected visit by user 105. Note, however, that this embodiment is provided merely as one non-limiting example. In another non-limiting example, the TTL value generator 126 may select the user-specific TTL value 212 by identifying, within the predicted future access pattern 210, the first instance in which the user 105 is expected not to access the web service for consecutive days and then selecting the user-specific TTL value 212 such that the requested data 152 will remain in the cache 120 until the last day before these consecutive days of not using the service. Stated differently, the TTL value generator 126 may set the user-specific TTL value 212 to be the last day before days of consecutive non-use of the service by the user 105.

Note that, in various embodiments, server system 102 is operable to generate more than one user-specific TTL value 212 value for a given user. For example, in some embodiments, server system 102 is operable to generate a user-specific TTL value 212 for each of multiple types of data maintained by the system 102 or for each of multiple types of services provided by the system 102. As a non-limiting example, as noted above, server system 102 may provide an online payment service to various remote users, according to some embodiments. In such embodiments, users may utilize multiple types of payment instruments (e.g., bank accounts, credit cards, debit cards, etc.) for use in online transactions. In some such embodiments, server system 102 is operable to generate, for user 105, a user-specific TTL value 212 for each instrument type to further improve storage utilization in cache 120. For example, consider an instance in which user 105 uses a first instrument type (e.g., a credit card) very frequently but rarely uses a second instrument type (e.g., a debit card). In such an instance, server system 102 may generate a user-specific TTL value 212 for both the first and second instrument types, according to some embodiments. For example, in response to a request to retrieve data associated with the first instrument type, server system 102 may generate a first user-specific TTL value 212 by applying access pattern information corresponding to the user 105's access history related to the first instrument type to the prediction model 128, which may generate a predicted future access pattern that indicates a distribution of days on which the user 105 is expected to access the first instrument type. As described above, this predicted future access pattern may then be used to generate the user-specific TTL value 212 associated with the first instrument type. Similarly, in response to a request to retrieve data associated with the second instrument type, server system 102 may generate a second user-specific TTL value 212 by applying access pattern information corresponding to the user 105's access history related to the second instrument type to the prediction model 128, which may generate a predicted future access pattern that indicates a distribution of days on which the user 105 is expected to access the second instrument type. This predicted future access pattern, in turn, may be used to generate the user-specific TTL value 212 associated with the second instrument type. Further note that, although described above with reference to a single user 105, the disclosed systems and methods may be used to generate user-specific TTL values for any suitable number of users of one or more web services provided by server system 102. Additionally, though the process of generating user-specific TTL values has been described as being performed by the same server system 102 that provides the web service, this embodiment is provided as a non-limiting example. In other embodiments, the user-specific TTL values may be generated by one or more computer systems that are separate from the one or more computer systems used to provide the web service.

In various embodiments, user-specific TTL value 212 may be specified using various suitable formats, which may vary depending on the particular technology used to implement cache 120. For example, in some embodiments, the user-specific TTL value 212 may be specified in terms of days, hours, minutes, seconds, etc. remaining until the corresponding requested data 152 is to be evicted from the cache 120. In other embodiments, the user-specific TTL value 212 may be specified as a particular time at which the data 152 is to be evicted. As described in more detail below with reference to FIGS. 3 and 4, once the TTL value generator 126 generates the user-specific TTL value 212, it may then be stored in the cache 120 or the database 110, according to various embodiments, and used to determine when to evict the requested data 152 (or other items of data associated with the user 105) from the cache 120.

Figure 3:
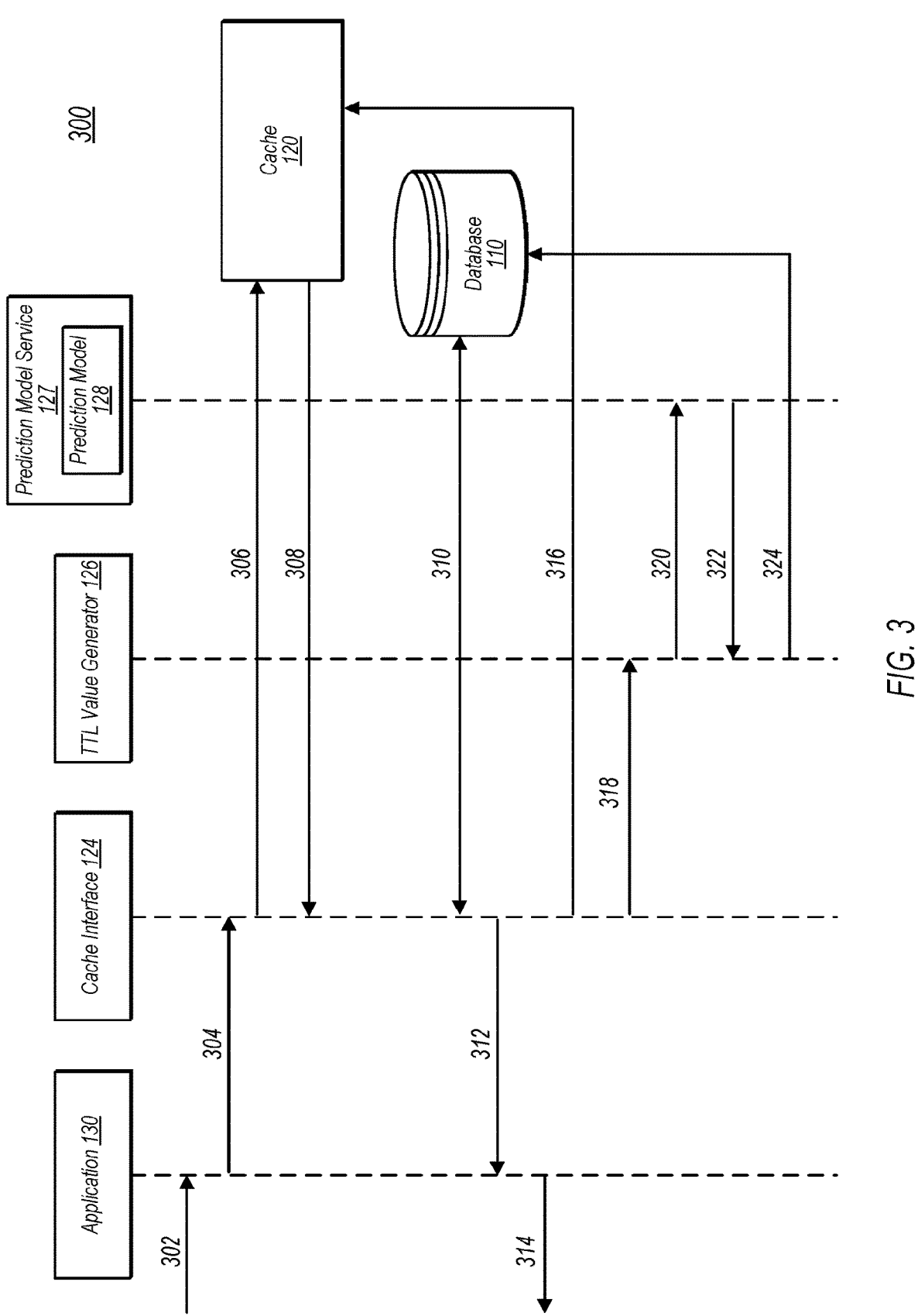
FIGS. 3-4 are communication diagrams illustrating example deployment architectures that may be used to utilize user-specific TTL values in a server system, according to some embodiments.
Figure 4:
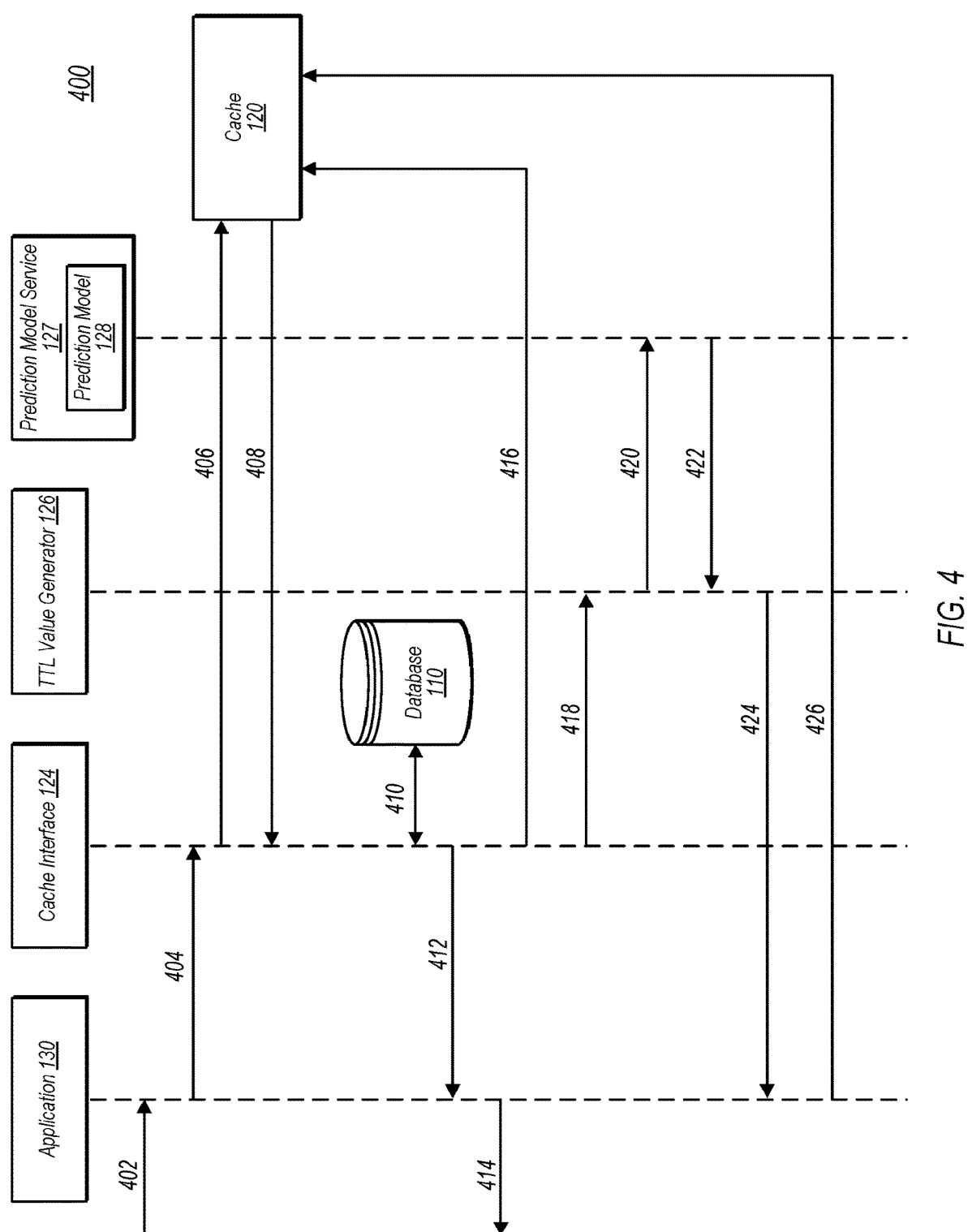

In FIGS. 3-4, communication diagrams 300 and 400 respectively show two example deployment architectures that may be used to utilize user-specific TTL values in server system 102, according to some embodiments. In the deployment architecture shown in FIG. 3, server system 102 is operable to store the requested data 152 in the cache 120 with an initial TTL value while it generates the user-specific TTL value 212, as described above. Once the user-specific TTL value 212 is generated, server system 102 may then update the database 110 to specify, for the user 105, the user-specific TTL value 212.

For example, at 302, in the illustrated embodiment, application 130 receives a request (such as request 150 of FIG. 1) for data from a user 105. In response to communication 302, application 130 sends a request 304 to the cache interface 124 to retrieve the requested data 152. At 306, in the depicted embodiment, the cache interface 124 queries the cache 120 to determine whether the requested data 152 is already stored in the cache 120. In the depicted embodiment, the requested data 152 is not stored in the cache 120, resulting in a cache miss at 308. In response to this cache miss, cache interface 124 retrieves the requested data 152 from the database 110 at 310. As discussed above, once retrieved, server system 102 may (at 312) return the requested data 152 to the application 130, which may provide it to the client device 104 (at 314).

At 316, in the depicted embodiment, cache interface 124 stores the requested data 152, along with an initial TTL value for the requested data 152, in the cache 120. As a non-limiting example, this initial TTL value may be a default TTL value based, for example, on the web service being accessed, the type of the requested data 152, etc. In other embodiments, this initial TTL value may be a prior user-specific TTL value that was previously generated for the user 105. As described below, this initial TTL value is subsequently replaced with a user-specific TTL value 212, according to various embodiments, to facilitate improved utilization of cache 120.

At 318, in the depicted embodiment, cache interface 124 sends a TTL value request to TTL value generator 126, which, at 320, sends a request to prediction model service 127. As discussed above, in various embodiments the prediction model service 127 is operable to use predictive model 128 to generate and return, at 322, information indicative of a predicted future access pattern for the user 105, which the TTL value generator 126 may use to generate a user-specific TTL value 212. At 324, in the depicted embodiment, TTL value generator 126 updates the database

110 with the user-specific TTL value 212. For example, in embodiments in which server system 102 provides an online payment service to various users, including user 105, server system 102 may update the database 110 with the user-specific TTL value 212 for the user account of user 105 and the instrument type to which the user-specific TTL value 212 relates.

In FIG. 4, diagram 400 includes communications 402-426. Note, however, that communications 402-422 track corresponding communications 302-322 of FIG. 3, in this depicted embodiment. In the example deployment architecture demonstrated in FIG. 4, however, rather than updating the database 110 (as in communication 324 of FIG. 3), the TTL value generator 126 instead provides the user-specific TTL value 212 to the application 130 (at communication 424), which then updates the cache 120 (e.g., the corresponding Couchbase™ document) with the user-specific TTL value 212.

Note that, regardless of the particular deployment architecture selected, cache 120, in various embodiments, is critical to the server system 102's infrastructure and its ability to quickly serve user traffic. As such, in various embodiments, it is desirable to determine and utilize user-specific TTL values 212 in a manner that does not interfere with the cache 120's ability to quickly service requests. For example, as shown in FIGS. 3 and 4, user-specific TTL values 212 may be generated asynchronously from servicing user requests so as to not degrade the performance of the server system 102.

Example Methods

Turning now to FIG. 5, a flow diagram illustrating an example method 500 for generating user-specific TTL values is depicted, according to some embodiments. In various embodiments, method 500 may be performed by server system 102 of FIG. 1. For example, server system 102 may include (or have access to) a non-transitory, computer-readable medium having program instructions stored thereon that are executable by server system 102 to cause the operations described with reference to FIG. 5. Note that, in some embodiments, server system 102 may be implemented using a single computer system. In other embodiments, server system 102 may be implemented using multiple computer systems (e.g., multiple machines at a datacenter). In FIG. 5, method 500 includes elements 502-508. Although these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, a server system maintains a cache data store that is operable to store data for a plurality of users associated with a web service. For example, in various embodiments, server system 102 may maintain cache system 120 that is operable to store data for multiple end users, including user 105. At 504, in the illustrated embodiment, in response to a cache miss for a request from a first one of a plurality of users, the server system generates a user-specific TTL value for the first user. For example, as noted above, the requested data 152 may not be stored in the cache 120 at the time that user 105 sends the request 150, resulting in a cache miss. In response to this cache miss, the server system 102 may retrieve the requested data 152 from the database 110 and provide it to the client device 104. As described herein, the server system 102 may store this requested data 152 in the cache 120 to facilitate faster retrieval in the future. Additionally, as described in more detail below, the disclosed systems and methods may utilize a user-specific TTL value for the requested data 152, enabling improved cache-hit ratios and increased storage utilization.

In the depicted embodiment, element 504 includes elements 506 and 508. At 506, in the illustrated embodiment, the server system uses a machine learning model to generate a predicted future access pattern for the first user, where the predicted future access pattern indicates a distribution of time periods during which the first user is expected to access the web service provided by the server system 102. For example, in some embodiments, generating the predicted future access pattern for the first user includes retrieving access pattern information (e.g., from the user access information store 122) associated with the first user. In various embodiments, this access pattern information is indicative of an access history, by the first user, of the web service over a previous time period. Further, in various embodiments, generating the predicted future access pattern includes applying at least a portion of the access pattern information to the machine learning model 128 to generate the predicted future access pattern for the first user.

At 508, in the illustrated embodiment, the server system determines the user-specific TTL value for the first user based on the predicted future access pattern. For example, as noted above, TTL value generator 126 may generate the user-specific TTL value for user 105 using various suitable algorithms. For example, in some embodiments, TTL value generator 126 determines the user-specific TTL value by analyzing the predicted future access pattern to identify, with the distribution of days, a series of consecutive days during which the first user is expected to access the service and selecting the user-specific TTL value based on a number of days in the series of consecutive days. In other embodiments, TTL value generator 126 determines the user-specific TTL value by identifying, based on the predicted future access pattern, a first instance of consecutive days in which the first user is not expected to access the web service, and then selecting the user-specific TTL value as a number of days, in the distribution of days, prior to the first instance of consecutive days in which the first user is not expected to access the web service.

Note that, in various embodiments, subsequent to the cache miss, the server system retrieves the requested data from a database and sends the requested data to a user device associated with the first user. In some embodiments, such as those described above with reference to FIG. 3, the server system updates the database with the user-specific TTL value subsequent to sending the requested data to the user device. In some embodiments, method 500 further includes receiving, by the server system, a subsequent request from the first user for the same requested data. In response to a second cache miss for the requested data, the server system may retrieve the data and the user-specific TTL value from the database. Subsequent to sending the requested data to the user device, the server system may then store the requested data in the cache data store with the user-specific TTL value. In other embodiments, such as those described above with reference to FIG. 4, subsequent to sending the requested data to the user device, the server system stores the requested data in the cache data store with an initial TTL value and, subsequent to generating the user-specific TTL value, updates the initial TTL value in the cache data store with the user-specific TTL value. Further, in some such embodiments, the server system may receive a subsequent request from the first user for the requested data prior to an expiration of the user-specific TTL value. In such embodiments, the server system may service this subsequent request by retrieving the requested data from the cache data store.

As noted above, in various embodiments, the server system is operable to generate user-specific TTL values for any suitable number of users of its web service. For example, in some embodiments, method 500 further includes generating a second user-specific TTL value for a second user in response to a cache miss for a request from the second user of the web service. In such embodiments, generating the second user-specific TTL value may include using the machine learning model to generate a second predicted future access pattern for the second user that indicates a second distribution of time periods during which the second user is expected to access the web service, and determining the second user-specific TTL value for the second user based on the second predicted future access pattern. In various embodiments, the user-specific TTL values for different users are different, since these values are based on the predicted future access patterns of the respective users. For example, in some embodiments, the predicted future access pattern for the first user indicates that the first user is expected to access the web service more frequently than the second user during a future time interval. In such embodiments, the user-specific TTL value for the first user may be greater than the second user-specific TTL value for the second user. Accordingly, in such embodiments, method 500 may further include evicting data from the cache data store based on the user-specific TTL value, including by evicting data associated with the second user from the cache data store based on the second user-specific TTL value but not evicting (that is, retaining) data associated with the first user in the cache data store based on the first user-specific TTL value.

Further, in various embodiments, method 500 includes generating different user-specific TTL values, for a given user, for different types of data. For example, in some embodiments, the request received at 504 is a request from the first user for a first type of data maintained by the server system. In some such embodiments, method 500 may further include receiving, from the first user, a second request for a second type of data maintained by the server system. In response to a second cache miss for the second request, the server system 102 may generate a second user-specific TTL value for the first user. In some such embodiments, the server system 102 generates the second user-specific TTL value for the first user by using the machine learning model to generate a second predicted access pattern for the first user that indicates a second distribution of time periods (e.g., days, hours, etc.) during which the first user is expected to request the second type of data, and determining the second user-specific TTL value based on the second predicted access pattern. Additionally note that, although disclosed with reference to cache systems, the disclosed techniques for generating user-specific TTL values using machine learning may also be implemented in other contexts, as desired.

Referring to FIG. 6, a flow diagram illustrating an example alternative method 600 for generating user-specific TTL values is depicted, according to some embodiments. In various embodiments, method 600 may be performed by server system 102 of FIG. 1. For example, server system 102 may include (or have access to) a non-transitory, computer-readable medium having program instructions stored thereon that are executable by server system 102 to cause the operations described with reference to FIG. 6. Note that, in some embodiments, server system 102 may be implemented using a single computer system. In other embodiments, server system 102 may be implemented using multiple computer systems (e.g., multiple machines at a datacenter). In FIG. 6, method 600 includes elements 602-606. Although these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, a server system maintains a cache data store that is operable to store data for a plurality of users associated with a web service. At 604, in the illustrated embodiment, the server system trains a machine learning model based on access pattern information corresponding to a set of the plurality of users of the web service. In various embodiments, for a given one of the set of users, the access pattern information is indicative of an access history, of the given user, of the web service over a previous time period (e.g., 30 days, 60 days, 90, days, etc.). In some embodiments, training the machine learning model includes training a long short-term memory (LS™) artificial neural network. At 606, in the illustrated embodiment, in response to a cache miss associated with a first one of the plurality of users, the server system generates a user-specific TTL value for the first user using the machine learning model. For example, in some embodiments, element 606 includes the server system retrieving access pattern information associated with the first user, where the access pattern information is indicative of an access history, by the first user, of the web service over a previous time period. Further, in various embodiments, element 606 includes the server system applying at least a portion of the access pattern information associated with the first user to the machine learning model to generate a future access pattern for the first user for a future time period. In some such embodiments, the predicted future access pattern indicates a distribution of time periods (e.g., days) during which the first user is expected to access the web service.

Further, in some embodiments, the generating further includes determining the user-specific TTL value for the first user based on the predicted future access pattern. For example, in some embodiments, method 600 includes the server system identifying, based on the predicted future access pattern, a first instance of consecutive time periods (e.g., days, weeks, etc.) during which the first user is expected not to access the web service and selecting the user-specific TTL value as a number of time periods, in the distribution of time periods, prior to the first instance of consecutive time periods in which the first user is not expected to access the web service.

Example Computer System

Figure 7:
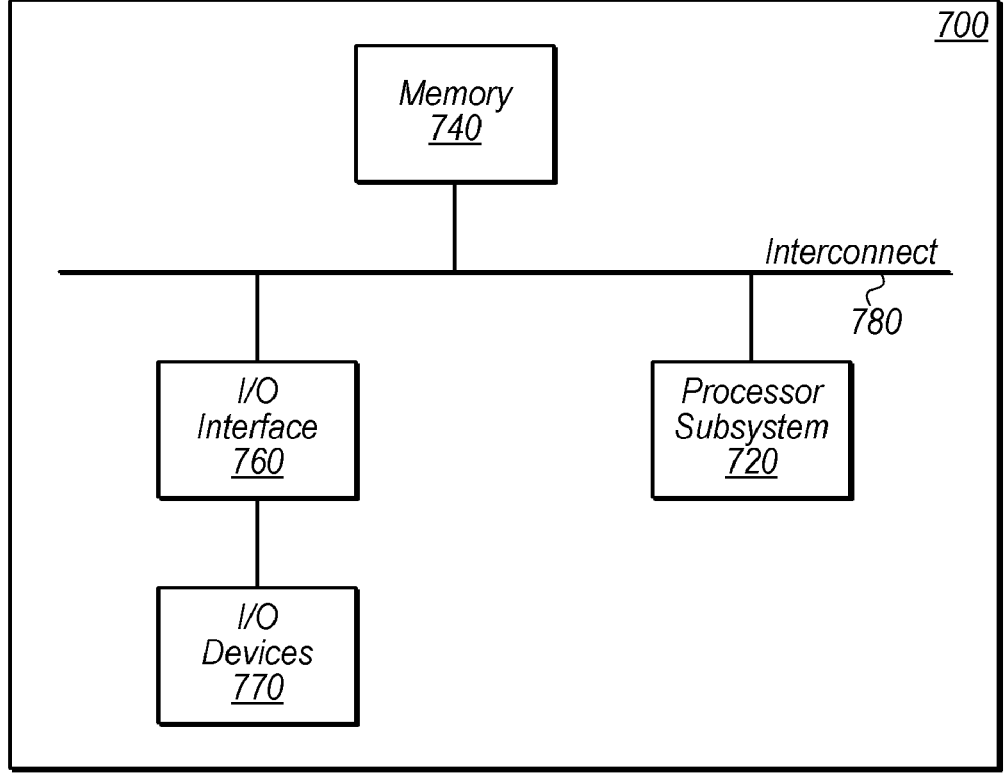
FIG. 7 is a block diagram illustrating an example computer system, according to some embodiments.

Referring now to FIG. 7, a block diagram of an example computer system 700 is depicted, which may implement one or more computer systems, such as server system 102 of FIG. 1, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., TTL value generator 126, prediction model service 127, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardware circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer-implemented method, comprising operations including:

maintaining, by a server system, a cache data store operable to store data for a plurality of users associated with a web service;

generating, by the server system using a machine learning model, a user-specific time-to-live (TTL) value for data associated with a first user of the plurality of users based on one or more predicted future accesses of the web service by the first user, wherein said generating comprises:

applying user access information associated with the first user to the machine learning model to generate the one or more predicted future accesses of the web service by the first user, the one or more predicted future accesses indicating a future time period during which the first user is predicted to access the web service; and replacing, by the server system, an initial TTL value previously generated for the data associated with the first user with the user-specific TTL value, wherein replacing the initial TTL value includes updating the cache data store by storing the user-specific TTL value along with the data associated with the first user in the cache data store.

2. The computer-implemented method of claim 1, wherein the initial TTL value and the user-specific TTL value are for the data associated with the first user, of the plurality of users, that is stored in the cache data store.

3. The computer-implemented method of claim 1, wherein the user access information is indicative of an access history, by the first user, of the web service over a previous time period.

4. The computer-implemented method of claim 3, wherein the user access information includes a set of digits corresponding to the access history, each index of the set of digits indicating whether the first user accessed the web service during a given unit of time over the previous time period.

5. The computer-implemented method of claim 1, wherein generating, by the server system, using the machine learning model, the user-specific TTL value for the first user comprises further operations including:

analyzing the user access information to identify a series of sequential units of time during which the first user is predicted to access the web service; and determining the user-specific TTL value based on the identified series of sequential units of time.

6. The computer-implemented method of claim 5, wherein the user-specific TTL value is selected as a number that corresponds to a last unit of time on which the first user is predicted to access the web service.

7. The computer-implemented method of claim 1, wherein the user-specific TTL value is associated with a specific type of data maintained in the cache data store, and wherein the server system is configured to generate a plurality of user-specific TTL values associated with different types of data for the first user.

8. A non-transitory, computer-readable medium having instructions stored thereon that are executable by a server system to perform operations comprising:

maintaining a cache data store operable to store data for a plurality of users associated with a web service; and responsive to a request for data associated with a first user of the plurality of users, generating, using a machine learning model, a user-specific time-to-live (TTL) value for the data based on one or more predicted future accesses of the web service by the first user, wherein said generating comprises:

applying user access information associated with the first user to the machine learning model to generate the one or more predicted future accesses of the web service by the first user, the one or more predicted future accesses indicating a future time period during which the first user is predicted to access the web service; and updating the cache data store by replacing an initial TTL value with the user-specific TTL value, wherein the user-specific TTL value is stored along with the data associated with the first user within the cache data store.

9. The non-transitory, computer-readable medium of claim 8, wherein the operations further include:

transmitting requested data specified in the request for data to a user device associated with the first user; and storing the requested data in the cache data store.

10. The non-transitory, computer-readable medium of claim 9, wherein the operations further include:

prior to an expiration of the user-specific TTL value, receiving a subsequent request from the first user for the requested data; and servicing the subsequent request by retrieving the requested data from the cache data store.

11. The non-transitory, computer-readable medium of claim 9, wherein the operations further include:

determining that the user-specific TTL value for the first user has expired; and evicting the requested data from the cache data store based on the determination.

12. The non-transitory, computer-readable medium of claim 8, wherein the machine learning model is implemented using one or more recurrent neural networks (RNNs).

13. The non-transitory, computer-readable medium of claim 8, wherein the operations further include:

analyzing the user access information to identify a series of consecutive units of time during which the first user is predicted to access the web service; and determining the user-specific TTL value based on the identified series of consecutive units of time.

14. The non-transitory, computer-readable medium of claim 8, wherein the user-specific TTL value and requested data specified in the request for data are associated with a first instrument type, and wherein the operations further include:

receiving another request from the first user for data associated with a second instrument type; and generating, using the machine learning model, a separate user-specific TTL value for the second instrument type based on user access information associated with the second instrument type.

15. A system comprising:

a processor; and a non-transitory computer-readable medium having stored thereon instructions that are executable by the processor to cause the system to perform operations comprising:

maintaining a cache data store operable to store data for a plurality of users associated with a web service;

generating using a machine learning model, a user-specific time-to-live (TTL) value for data associated with a first user of the plurality of users based on one or more predicted future accesses of the web service by the first user, wherein said generating comprises:

applying user access information associated with the first user to the machine learning model to generate the one or more predicted future accesses of the web service by the first user, the one or more predicted future accesses indicating a future time period during which the first user is predicted to access the web service; and replacing an initial TTL value previously generated for the data associated with the first user with the user-specific TTL value, wherein replacing the initial TTL value includes updating the cache data store by storing the user-specific TTL value along with the data associated with the first user in the cache data store.

16. The system of claim 15, wherein the initial TTL value and the user-specific TTL value are for the data associated with the first user, of the plurality of users, that is stored in the cache data store.

17. The system of claim 15, wherein the user access information is indicative of an access history, by the first user, of the web service over a previous time period.

18. The system of claim 17, wherein the user access information includes a set of digits corresponding to the access history, each index of the set of digits indicating whether the first user accessed the web service during a given unit of time over the previous time period.

19. The system of claim 15, wherein the instructions are further executable to cause the system to train the machine learning model by:

assessing an accuracy of an access history predicted by the machine learning model for the first user; and calculating a cost function based on the assessment.

20. The system of claim 15, wherein the machine learning model is a long short-term memory (LSTM) artificial neural network.

\*   \*   \*   \*   \*